United States Patent [19]

Ruckey et al.

[11] Patent Number: 4,725,398
[45] Date of Patent: Feb. 16, 1988

[54] CABLE REEVING SYSTEM

[75] Inventors: Robert J. Ruckey, New Milford; Alvaro Obligado, New Fairfield, both of Conn.

[73] Assignee: Nuclear Energy Services, Inc., Danbury, Conn.

[21] Appl. No.: 939,678

[22] Filed: Dec. 8, 1986

[51] Int. Cl.⁴ .............................................. G21C 19/20
[52] U.S. Cl. .................................... 376/270; 376/249; 376/260; 414/146; 104/183; 254/387
[58] Field of Search ............... 376/260, 261, 272, 270, 376/264, 227, 249; 414/146, 281, 661, 514, 515; 104/173.1, 174, 175, 176, 162, 183; 212/142, 189; 254/387; 60/905; 272/97, 70

[56] References Cited

U.S. PATENT DOCUMENTS

| 2,743,224 | 4/1956 | Ohlinger | 376/261 |
| 3,260,384 | 7/1966 | Lemesle et al. | 414/146 |
| 3,437,315 | 4/1969 | McDonald, Jr. | 104/183 |
| 3,637,096 | 12/1972 | Crate | 414/146 |
| 3,940,577 | 2/1976 | Christofer | 414/146 |
| 4,069,766 | 1/1978 | Bernstein | 414/146 |
| 4,576,100 | 3/1986 | Zanin | 376/272 |
| 4,584,166 | 4/1986 | Greacen | 376/260 |
| 4,649,016 | 3/1987 | Hardin, Jr. | 414/146 |

Primary Examiner—Harvey E. Berrend
Assistant Examiner—Daniel Wasil
Attorney, Agent, or Firm—Charles J. Brown

[57] ABSTRACT

A cable-driven arm-reciprocating system particularly useful for transferring nuclear fuel bundles from a nuclear reactor pool to a spent fuel storage pool, wherein an arm-retracting cable extends from a winch drum around fixed and movable-axis sheaves to a retracting anchor device and an arm-extending cable extends from the same winch drum also around fixed and movable-axis sheaves to an extending anchor device, each anchor device including spring means for maintaining and allowing for variations in cable tension.

4 Claims, 5 Drawing Figures

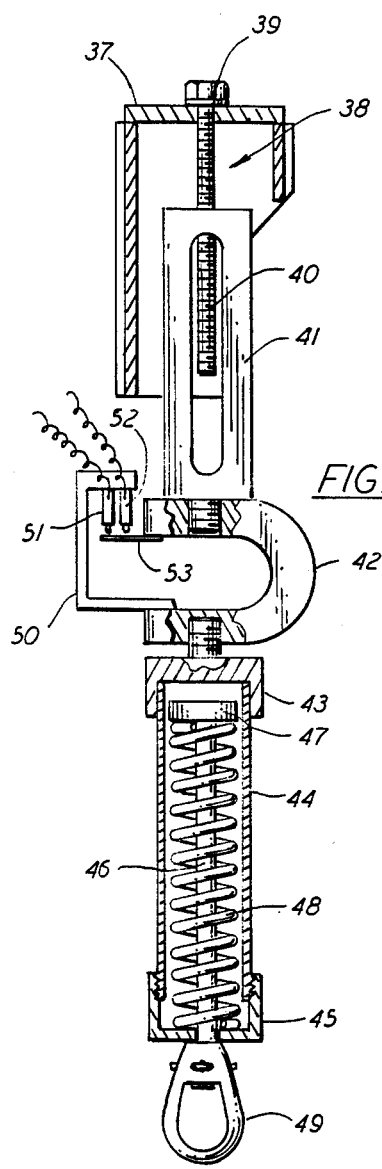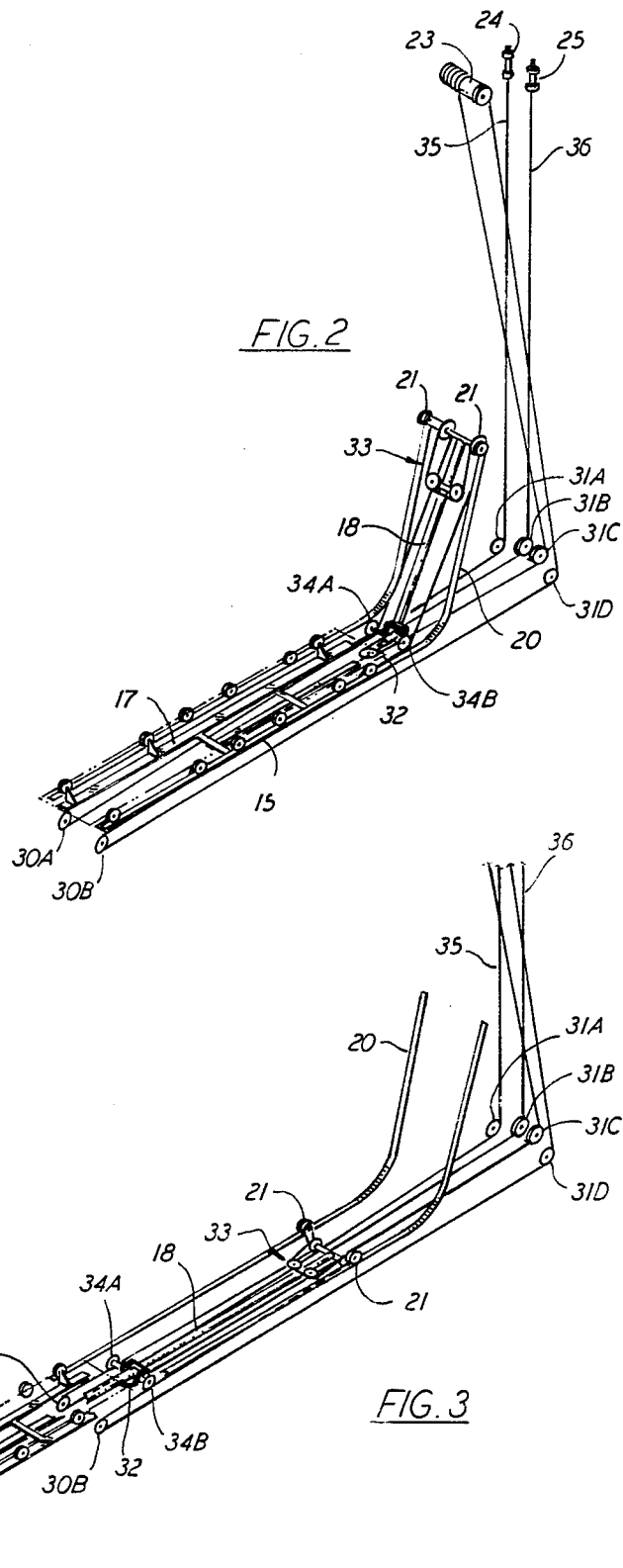

CABLE REEVING SYSTEM

BACKGROUND OF THE INVENTION

Various cable-driven arm-reciprocating systems are available for transferring nuclear fuel bundles from a nuclear reactor pool to a spent fuel storage pool. During refueling it is necessary to transfer the fuel bundles from the reactor core to a spent fuel building flooded with water. The spent fuel bundles must remain submerged for an extended period as they cool and during this time the reactor is normally returned to operation. Therefore the spent fuel bundles and their pool must be located apart from the reactor container vessel. Access to the reactor container vessel is through an elongated transfer tube in the vessel wall.

Some prior fuel transfer systems have relied strictly on rectilinear motion of the fuel transfer carriage assembly. An example is that described in U.S. Pat. No. 3,637,096 wherein some of the cable sheaves of the system are permanently mounted in the reactor pool. The same is true of a fuel transfer machine described in U.S. Pat. No. 4,069,766. Not only is it a disadvantage to have some of the sheaves of the system in the transfer tube or reactor vessel but with purely rectilinear motion of the system the spent fuel pool must be large enough to accommodate the full stroke of the apparatus.

The prior art also includes a form of fuel bundle transfer apparatus wherein an arm having end-to-end articulated forward and rearward portions is longitudinally translated between an extended position where the arm portions are aligned on a straight track and a retracted postition where the rearward arm portion is angled on a curved track out of alignment with the forward arm portion. However the cable reeving system for this prior art apparatus was deficient. It consisted of a cable attached to the forward and rearward ends of the rearward arm portion. A first run of the cable extended forwardly from a rearward arm attachment over a forward fixed-axis sheave and also over a pick-up roller on the forward end of the rearward arm potion when the pick-up roller was rearwardly of forward fixed-axis sheave. A second run extended rearwardly from the forward fixed-axis sheave around a rearward fixed-axis sheave to a winch drum. A third run extended from the winch drum around another rearward fixed-axis sheave and forward to attachment with the forward end of the rearward arm portion.

The difficulty with this reeving system was that it lacked cable tension control. After prolonged use the cable would tend to loosen and even an occasion come off one or more of the sheaves. It is the principal purpose of the present invention to improve upon such a cable reeving system so that it includes the needed tension control.

SUMMARY OF THE INVENTION

The invention provides a cable reeving system for apparatus for longitudinal translation of an arm having end-to-end articulated forward and rearward portions between an extended position where the arm portions are aligned on a straight track and a retracted position where the rearward arm portion is angled on a curved track out of alignment with the forward arm portion. The arm and tracks are adapted to be submerged beneath the surface of a pool.

The cable reeving system of the invention comprises a series of fixed-axis sheaves. There are two forward fixed-axis sheaves forwardly of the rearward end of the rearward arm portion in the extended arm position and also forwardly of the rearward end of the forward arm portion in the retracted arm position. There are four rearward fixed-axis sheaves rearward of the rearward end of the forward arm portion in the retracted arm position. A series of movable-axis sheaves are also included comprising a retracting movable-axis sheave on the forward arm portion and at least one extending movable-axis sheave on the rearward end of the rearward end portion. Two pick-up rollers are provided on the rearward end of the forward arm portion. A driven winch drum is included above the fixed-axis sheaves and is adapted to be above the pool surface. Extending and retracting anchor devices are also are includes above the fixed-axis sheaves and are adapted to be above the pool surface.

The system of the invention further includes an extending cable yieldably attached at one end to the extending anchor device and running downwardly over one rearward fixed-axis sheave, then over one rearward fixed-axis sheave, then rearwardly over one of the pick-up rollers when the rearward end of the forward arm portion is rearward of the forward fixed-axis sheave, then rearwardly over the extending movable-axis sheave, then forwardly over the other pick-up roller when the rearward end of the forward arm portion is rearward of the forward fixed-axis sheave, then forwardly over the other forward fixed-axis sheave, then rearwardly over another of the rearward fixed-axis sheaves, then upwardly over and around the winch drum in one direction to a point of attachment thereto. A retracting cable is also attached to the winch drum and is wound around it in a direction opposite that of the extending cable. The retracting cable extends downwardly over another of the rearward fixed-axis sheaves, then forwardly over the retracting movable axis sheave, then rearwardly over another of the rearward fixed-axis sheaves, and then upwardly to and yieldably attached at the retracting anchor device.

In a preferred form of the invention each anchor device includes spring means for connecting each cable to a fixed point for maintaining and also allowing for variations in cable tension.

BRIEF DESCRIPTION OF THE DRAWINGS

FIG. 2 is a perspective view of the arm and cable reeving system also in retracted position;

FIG. 3 is a similar perspective view showing the arm in mid position;

FIG. 5 is an enlarged vertical section of one of the anchor devices.

DESCRIPTION OF PREFERRED EMBODIMENT

Figure 1:
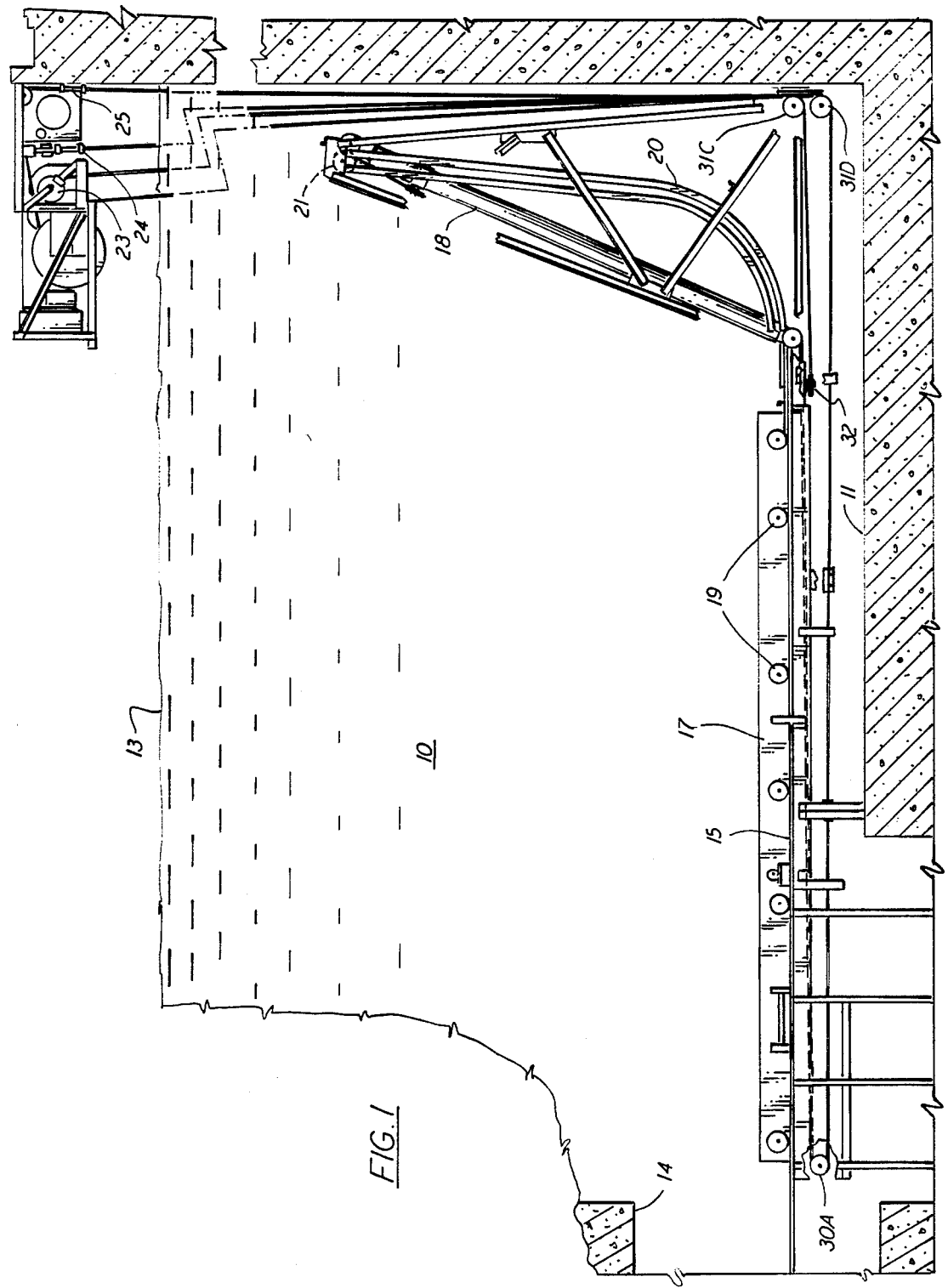
FIG. 1 is an elevation partly broken away showing the cable-driven arm-reciprocating system in a spent fuel storage pool in retracted position.

Referring first to FIG. 1, a spent fuel storage pool 10 is contained by a floor 11 and side walls 12. Submerged beneath a surface 13 of the pool 10 is an end of a transfer tube 14 which extends from the spent fuel storage pool 10 through a reactor vessel wall (not shown) to a reactor vessel. A straight track 15 supported on the floor 11 extends from the pool 10 into and through the transfer tube 14.

An arm having end-to-end articulated forward and rearward portions 17 and 18 is adapted to be longitudinally translated forwardly and rearwardly along the straight track 15. Rollers 19 on the arm forward portion 17 engage the straight track 15. Cointinuing from the rearward end of the straight track 15 is a curved track 20. Rollers 21 on the rearward end of the rearward arm portion 18 are adapted to ride along the curved track 20. As will be described below in more detail, the forward and rearward arm portions 17 and 18 are aligned on the straight track 15 when the arm is in its extended position and the rearward arm portion 18 is angled up by the curved track 20 out of alignment with the forward arm portion 17 when the arm is in its retracted position.

Above the surface 13 of the pool 10 is a motor-driven multiple-groove winch 23 and two anchor devices 24 and 25 which are described in more detail below. The cable reeving system of the invention is associated with the winch 23 and anchor devices 24 and 25 and with the arm forward and rearward portions 17 and 18 to translate the arm between forward and rearward positions as described in relation to FIGS. 2 to 4. A fuel bundle carriage (not shown) is displaced on the track 15 by the forward arm portion 17 into and out of the transfer tube 14 and since the rearward arm portion 18 rotates upwardly on the curved track 20 in the retracted position the stroke of the apparatus is not limited by the length of the pool 10.

Figure 4:
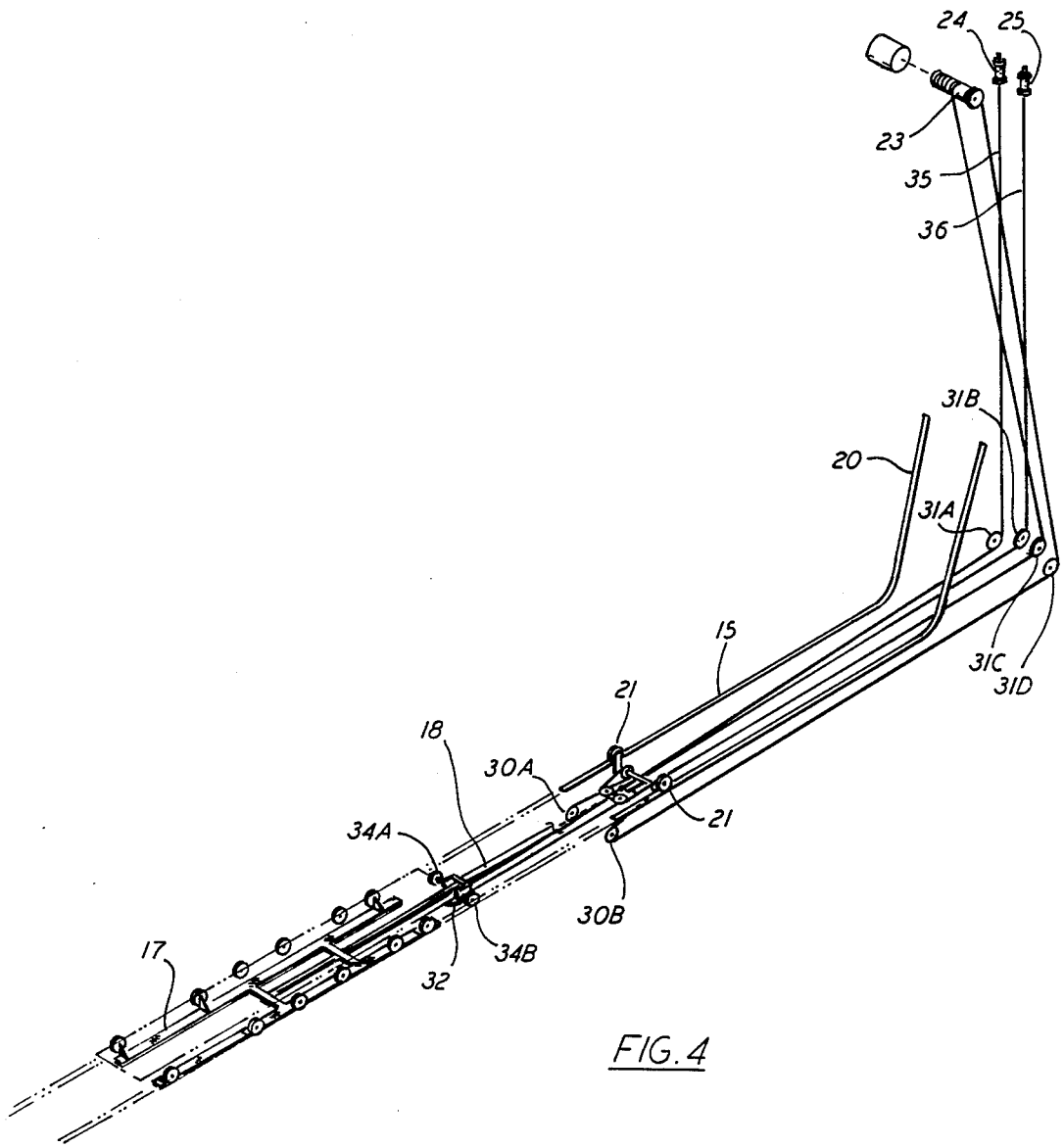
FIG. 4 is a similar perspective view showing the arm in extended position.

Turning now to FIGS. 2 to 4 two forward fixed-axis sheaves 30A and B are provided forwardly of the rearward end of the rearward arm portion 18 in the extended arm position shown in FIG. 4 and also forwardly of the rearward end of the forward arm portion 17 in the retracted position shown in FIG. 2. Four rearward fixed-axis sheaves 31A,B,C and D are included rearwardly of the rearward end of the forward arm portion 17 in the retracted arm position shown in FIG. 2.

A retracting movable-axis sheave 32 is mounted on the rearward end of the forward arm portion 17. An arrangement of four extending movable-axis sheaves 33 is included on the rearward end of the rearward arm portion 18, two on substantially vertical axes and two on a horizontal axis, though it is possible that only one extending movable axis sheave could suffice. Two pick-up rollers 34A and B are located on the rearward end of the forward arm portion 17.

An extending cable 35 is yieldably attached as desribed below at one end to the extending anchor device 24 and runs downwardly over the rearward fixed-axis sheave 31A. The cable 35 then extends forwardly over the forward fixed-axis sheave 30A and then rearwardly over the pick-up roller 34A when the rearward end of the forward arm portion 17 is rearward of the forward fixed-axis sheaves 30A and B as shown in FIGS. 2 and 3. Then the cable 35 continues rearwardly over the extending movable-axis sheaves 33 and then forwardly over the other pick-up roller 34B when the rearward end of the forward arm portion 17 is rearward of the forward fixed-axis sheaves 30A and B as shown in FIGS. 2 and 3. The cable 35 continues forwardly over the other forward fixed-axis sheave 30B and then rearwardly over the rearward fixed-axis sheave 31D. It then runs upwardly over and in multiple turns around the winch drum 23, clockwise as vewed toward the end of the drum 23 in one side of FIGS. 2 and 4, and is fixed to the drum 23. A second retracting cable 36 is fixed to the other side of the drum 23 and is wound in multiple clockwise turns (as viewed in the same diredctin) over the grooved drum. The cable 36 then extends downwardly over the rearward fixed-axis sheave 31C. It then continues forwardly to the retracting movable axis sheave 32, rearwardly over the rearward fixed-axis sheave 31B and upwardly to and yieldably attached at the retracting anchor device 25.

One of the anchor devices 24 or 25 is shown in FIG. 5 suspended from a fixed frame 37. The extending anchor device 24 and the retracting anchor device 25 may be of the same construction. It includes a bolt 38 having a head supported on the frame 37 and a shaft 40 extending downwardly in threaded engagement with a turnbuckle 41, the lower end of which is threaded to an upper arm of a C-shaped load detector 42. A lower end of the detector 42 has threaded to it an upper cap 43 of a cylinder 44. At the other end of the cylinder 44 is a lower cap 45 having a central hole through which a rod 46 extends. A flange 47 is secured to the upper end of the rod 46. Between that flange 47 and the lower cap 45 of the cylinder 44 is a compression spring 48. An eye 49 is fixed to the lower end of the rod 46 and the cable 35 or 36 of the reeving system is attachable to that eye.

It will be seen that tension on the cable 35 or 36 can be adjusted by turning the shaft 40 of the bolt 38 into or out of the turn-buckle 41. This both maintains and allows for variations in cable tension. An increase in tension on the cable 30 or 35 will be yieldably absorbed to a certain degree by compression of the spring 48, as might occur for example from an increase in friction in the sheaves or rollers of the system. The detector 42 is intended to serve as tension monitoring means responsive to cable tension for producing a signal when cable tension exceeds a certain amount, for example because of jamming of the cable or sheaves. The added tension will spread the upper and lower arms of the C-shaped detector 42.

There is schematically shown in FIG. 5 a switch arrangement for signalling two levels of such detection. The lower arm of the detector 42 carries a bracket 50 on which limit switches 51 and 52 are supported. An actuator 53 on the upper arm of the detector 42 is positioned such that as the detector arms spread under load the limit switch 51 will first be closed to trigger an alarm or signal, and then if the load continues to increase the limit switch 52 will be closed to automatically shut off power to the winch drum 23. Effectively, the loan limit switch 51 can be used to monitor cable pre-tension. Prior to operation the tension on each cable is adjusted by turning the screw 40 until the desired static cable tension is indicated by a signal actuated by the switch 51. This provides a guide means for indicating proper initial cable tension. The second switch 52 is utilized for overload protection. The reeving system is thus effectively assured of proper cable tension and protection against breakage in the event of partial or total jamming. These measures are of considerable importance in the operation of a remote controlled form of the reeving system of the invention in a nuclear power plant. The C-shaped detector and its associated signal system is commercially available and may be substituted by similar load-detecting devices.

The manner in which the cable 35 and 36 cause extension or retraction of the articulated arm, depending upon the direction of rotation of the winch drum 23, should be apparent from the foregoing description. If the drum 23 rotates counter-clockwise as seen from its end directed toward the viewer in FIGS. 2 and 4, tension is applied to the run of the extending cable 35 extending to the rearward fixed-axis sheave 31D and the run of the retracting cable 36 from the drum 23 to the rearward fixed-axis sheave 31C will be slack. This will pull the extending cable 35 through the extending movable-axis sheaves 33 and against the resistance of the extending anchor device 24 and cause the arm to move forwardly on the rollers 19 and 21 with slack being paid out on the retracting cable runs going to the retracting movable-axis sheave 32. If the winch direction is reversed, tension is applied to the run of the retracting cable 36 going to the rearward fixed-axis sheave 31C against the resistance of the retracting anchor device 25 and the run of the extending cable 35 to the rearward fixed-axis sheaves 31D goes slack. This pulls the carriage in by means of the retracting movable-axis sheave 32 and the extending cable 35 is paid out over the forward fixed-axis sheaves 30A and 30B and the extending movable-axis sheaves 33. In the fully retracted position of the articulated arm its rearward portion 18 angles upwardly on the curved track as described previously.

We claim:

1. In an apparatus for longitudinal translation of an arm having end-to-end articulated forward and rearward portions between an extended position where the arm portions are aligned on a straight track and a retracted position where the rearward arm portion is angled on a curved track out of alignment with the forward arm portion, the arm and tracks being adapted to be submerged beneath the surface of a pool, a cable reeving system comprising
   (a) fixed-axis sheaves comprising
     i. two forward fixed-axis sheaves forwardly of the rearward end of the rearward arm portion in the extended arm position and also forwardly of the rearward end of the forward arm portion in the retracted arm position, and
     ii. four rearward fixed-axis sheaves rearwardly of the rearward end of the forward arm portion in the retracted arm position;
   (b) movable-axis sheaves comprising
     i. a retracting movable-axis sheave on the forward arm portion, and
     ii. at least one extending movable-axis sheave on the rearward end of the rearward arm portion;
   (c) two pick-up rollers on the rearward end of the forward arm portion;
   (d) a driven winch drum above the fixed-axis sheaves and adapted to be above the pool surface;
   (e) extending and retracting anchor devices above the fixed-axis sheaves and adapted to be above the pool surface;
   (f) an extending cable yieldably attached at one end to the extending anchor device and running downwardly over one rearward fixed-axis sheave, then forwardly over one forward fixed-axis sheave, then rearwardly over one of the pick-up rollers when the rearward end of the forward arm portion is rearward of the forward fixed-axis sheaves, then rearwardly over the extending movable-axis sheave, then forwardly over the other pick-up roller when the rearward end of the forward arm portion is rearward of the forward fixed-axis sheaves, then forwardly over the other forward fixed-axis sheave, then rearwardly over another of the rearward fixed axis sheaves, then upwardly over and around the winch drum in one direction to a point of attachment thereto; and
   (g) a retracting cable also attached to the winch drum and wound around it in a direction opposite that of the extending cable and then extending downwardly over another of the rearward fixed-axis sheaves, then forwardly over the retracting movable-axis sheave, then rearwardly over another of the rearward fixed-axis sheaves, and then upwardly to and yieldably attached at the retracting anchor device.

2. Apparatus according to claim 1 in combination with a spent fuel pool and a fuel transfer tube in a nuclear reactor installation, wherein the arm reciprocates a fuel bundle carriage into and out of a reactor vessel through a transfer tube.

3. Apparatus according to claim 1 wherein each anchor device includes spring means for connecting each of the extending and retracting cables to a fixed point for maintaining and also allowing for variations in the tension of the cables.

4. Apparatus according to claim 3 wherein each anchor device further includes tension monitoring means responsive to the tension on each cable for producing a signal when cable tension exceeds a predetermined amount and for monitoring and adjusting proper cable operating pre-tension.

* * * * *